L. S. CLARK.
REPAIR LINK.
APPLICATION FILED JUNE 24, 1920.
1,409,928. Patented Mar. 21, 1922.
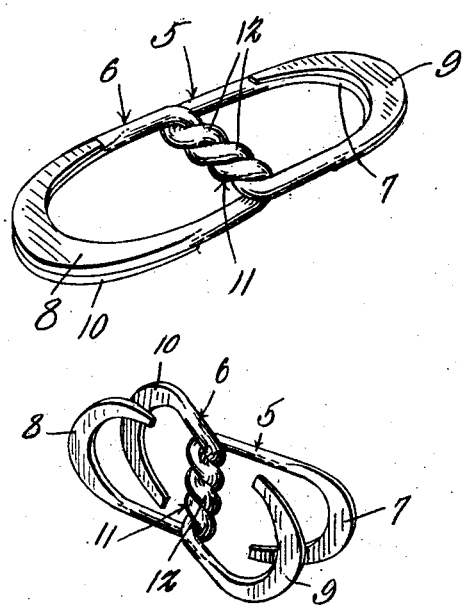
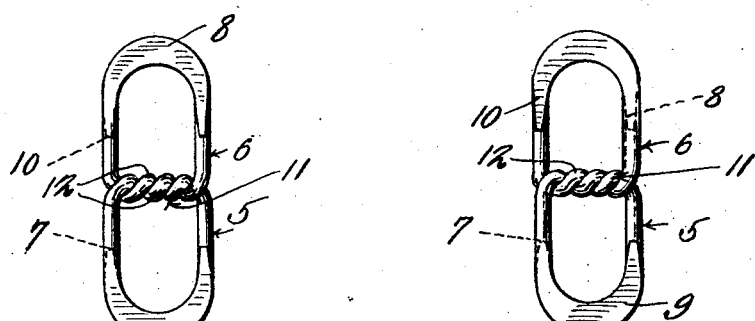
L. S. Clark
Inventor,
Frank B. Wooden.
Attorney.

UNITED STATES PATENT OFFICE.

LESTER S. CLARK, OF WOODENSBURG, MARYLAND.

REPAIR LINK.

1,409,928. Specification of Letters Patent. Patented Mar. 21, 1922.

Application filed June 24, 1920. Serial No. 391,296.

*To all whom it may concern:*

Be it known that I, LESTER S. CLARK, a citizen of the United States, residing at Woodensburg, in the county of Baltimore and State of Maryland, have invented a new and useful Repair Link, of which the following is a specification.

This invention relates to repair links for chains and is of the kind sometimes termed open links and has for its object the provision of a device that may be cheaply manufactured, that comprises few parts and in which the said parts are so formed as to be of uniform strength.

Another object of the invention is to produce a repair link comprising a pair of members pivotally connected in such manner as to be manually opened without the use of tools and yet withstand a maximum amount of service without becoming unduly worn at the joint or pivotal connection.

It is another object of the invention to provide a link whereby, without material change in the structure thereof, the same may be transformed from a pivotal opening link, to one in which the links must be forcibly sprung open for connection with the chain to be repaired.

With these and other objects in view which will appear as the description proceeds, my invention consists in the various features of construction, combination and arrangement of parts, as will be clearly understood from the description hereinafter appearing, taken in connection with the accompanying drawings, and as particularly pointed out in the appended claims, it being within the province of the invention to improve generally and to enhance the utility of devices of that class to which the invention belongs.

It will of course be understood that minor changes may be made, within the scope of what is claimed without departing from the spirit of the invention or sacrificing any of the advantages thereof.

In the drawing forming a part of this specification:—

Figure 1 is a perspective view of the link in closed position.

Figure 2 is a perspective view illustrating the link in a position ready for assembly with a chain.

Figure 3 is a plan view of a link constructed in accordance with the showing of Figures 1 and 2.

Figure 4 is a plan view of a slightly modified form of link.

From an inspection of the drawing it will be apparent that the device forming the subject matter of this invention, comprises two indentically formed members, designated generally by the reference characters 5 and 6, each having oppositely disposed hooks 7, 8 and 9, 10 respectively. The hooks of each member are connected intermediate their ends by a transversely extended portion 11, the two portions 11 being twisted together to form interengaging convolutions 12.

In the form of link shown in Figures 1, 2 and 3 the hook 7 of the member 5 and the hook 10 of the member 6 are disposed on the same side of the link so that pivotal movement between the two members is possible and the link may be readily opened for use, this being clearly illustrated in Figure 2 of the drawing.

When it is desired to form the link in such manner as to prevent pivotal movement between the two members of the link, it is only necessary to reverse the position of the overlapping hooks 7 and 9, or 8 and 10, from the position shown in Figure 3, that is, with the hooks of each of the members 5 and 6 extending in opposite directions from the same side of the link, as shown in Figure 4. In this form of the invention it is necessary to use force to spring the links apart sufficiently to insert the links of a chain to be repaired.

A link constructed as herein outlined may be very cheaply manufactured, since but one operation is necessary to pivotally connect the members of the link together, that of twisting the transverse connecting portions together, further, an exceedingly strong pivotal connection is the result of this intertwisted series of convolutions. It will also be observed that with the link closed, no lateral movement between the two members of the link is possible, which movement if present would tend to wear the connecting joint between the two members.

Having thus described the invention what is claimed is:

1. In a device of the class described, two approximately similar sections having their intermediate portions twisted together to form a series of interengaging coaxial convolutions and hooks extended in opposite directions from the said intermediate portions.

2. In a device of the class described, two approximately smilar sections having their intermediate portions twisted together to form a series of coaxial intertwisted convolutions and hooks extended in opposite directions from the said intermediate portions, the opposed hooks of each member being disposed on opposite sides of the intermediate portion, whereby pivotal movement between the two members is permitted.

3. A device of the class described, comprising a pair of cooperating members each having an intermediate portion provided at its ends with oppositely projecting hooks, the hooks of said members coacting to form closed loops at each end of the device, the intermediate portions of said members being twisted together upon each other in the form of convolutions, the convolutions of one member being of approximately the same diameter as the convolutions of the other member and alternating therewith.

LESTER S. CLARK.